US011734039B2

United States Patent
Tsirkin et al.

(10) Patent No.: US 11,734,039 B2
(45) Date of Patent: Aug. 22, 2023

(54) EFFICIENT HANDLING OF NETWORK TOPOLOGY CHANGE NOTIFICATION FOR VIRTUAL MACHINES

(71) Applicant: Red Hat, Inc., Raleigh, NC (US)

(72) Inventors: Michael Tsirkin, Lexington, MA (US); Karen Lee Noel, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 424 days.

(21) Appl. No.: 16/869,060

(22) Filed: May 7, 2020

(65) Prior Publication Data
US 2021/0349746 A1   Nov. 11, 2021

(51) Int. Cl.
*G06F 9/455* (2018.01)
(52) U.S. Cl.
CPC .......... *G06F 9/45558* (2013.01); *G06F 2009/45583* (2013.01); *G06F 2009/45595* (2013.01)
(58) Field of Classification Search
CPC ....... G06F 9/45558; G06F 2009/45583; G06F 2009/45595; G06F 9/45533; H04L 12/4641; H04L 41/12; H04L 45/02
USPC .......................................................... 718/1
See application file for complete search history.

(56) References Cited

U.S. PATENT DOCUMENTS

| | | | |
|---|---|---|---|
| 8,166,474 B1 * | 4/2012 | Delco ................. | G06F 9/45558 718/1 |
| 8,990,371 B2 | 3/2015 | Kalyanaraman et al. | |
| 10,003,498 B2 | 6/2018 | Shevenell et al. | |
| 2008/0155537 A1 * | 6/2008 | Dinda ................. | H04L 67/1002 718/1 |
| 2012/0005521 A1 * | 1/2012 | Droux ................. | H04L 41/0668 718/1 |
| 2016/0246632 A1 * | 8/2016 | Tsirkin ............... | G06F 9/45558 |
| 2016/0359917 A1 * | 12/2016 | Rao ...................... | H04L 43/0841 |
| 2019/0026143 A1 * | 1/2019 | Tsirkin ............... | G06F 9/45545 |
| 2019/0050273 A1 * | 2/2019 | Tamir ..................... | H04L 47/23 |
| 2019/0065229 A1 * | 2/2019 | Tsirkin ............... | H04L 43/0817 |
| 2019/0173841 A1 * | 6/2019 | Wang .................... | G06F 9/5083 |
| 2019/0363965 A1 * | 11/2019 | Tewari ............... | H04L 43/0841 |
| 2020/0028785 A1 * | 1/2020 | Ang .................... | G06F 9/45558 |
| 2021/0152642 A1 * | 5/2021 | Ilan ..................... | H04L 61/2007 |
| 2021/0226899 A1 * | 7/2021 | Karunakaran .......... | H04L 63/12 |

OTHER PUBLICATIONS

VMWARE "What Is Azure Network Watcher?", Azure Network Watcher, 2018, 7 pages.

* cited by examiner

*Primary Examiner* — Kenneth Tang
(74) *Attorney, Agent, or Firm* — Lowenstein Sandler LLP

(57) ABSTRACT

Systems and methods for memory management for virtual machines. An example method may include receiving, by a hypervisor running on a host computer system, a request that no topology change notifications be delivered to a virtual machine managed by the hypervisor. The method may include then install a packet filter on a virtual network interface controller (vNIC) associated with the virtual machine. Responsive to receiving, by the packet filter, a topology change notification packet, the method may include dropping the topology change notification packet.

17 Claims, 6 Drawing Sheets

US 11,734,039 B2

EFFICIENT HANDLING OF NETWORK TOPOLOGY CHANGE NOTIFICATION FOR VIRTUAL MACHINES

TECHNICAL FIELD

The present disclosure is generally related to virtualized computer systems, and more particularly, to effective handling of network topology change notification for virtual machines.

BACKGROUND

Virtualization herein shall refer to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device and input/output (I/O) virtualization involves managing the routing of I/O requests between virtual devices and the shared physical hardware.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
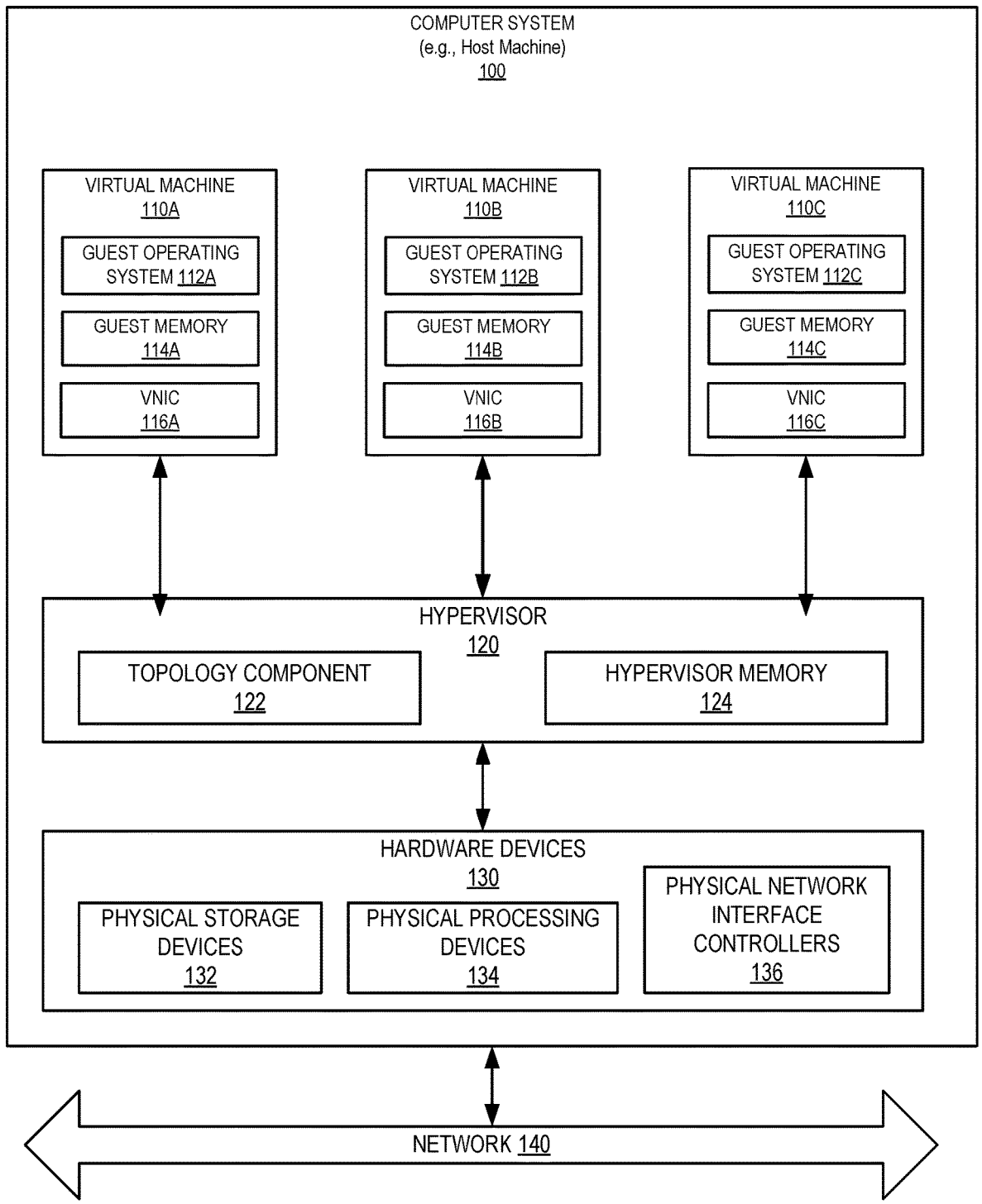
FIG. 1 depicts a high-level block diagram of an example host computer system that performs topology change notification management, in accordance with one or more aspects of the present disclosure.

Described herein are systems and methods for efficient handling of network topology change notification for virtual machines.

Virtual machines residing on a host computer system may communicate with each other as well as with other physical machines on a physical network. Communication is performed using virtual network interface controllers (vNICs) and virtual switches and/or network bridges. A vNIC is a type of virtual adapter configured to provide a virtual machines with a virtual interface which can communicate with other networked devices using specific physical layer and data link layer standards. A virtual switch is a logically defined layer 2 device that passes frames between nodes. vNICs are connected to virtual ports of the virtual switch. A network bridge interconnects two local area networks (LANs) together and separate network segments. A segment may be a section of a network that is separated by network bridges, switches, and/or routers. A layer 2 (L2, or link layer) network bridge uses media access control (MAC) address information to make decisions regarding forwarding data packets. When two networks are in a bridged connection mode, a virtual machine connects to a physical network through the host physical network interface controller (NIC).

During a migration, the virtual machine can be disassociated from the origin hypervisor running on the origin host computer system and can be associated with the destination hypervisor running on the destination computer system. The network location of the virtual machine is considered as changed after the migration. Network devices in the network to which the new hypervisor is coupled may need to be notified of the virtual machine's new association with the new hypervisor so that the virtual machine can continue to communicate with the network devices after migration. For example, while a MAC address and/or an Internet Protocol (IP) address of the virtual machine may not have to be changed after the migration, one or more network devices (e.g., one or more data link layer switches) may need to be reconfigured to facilitate communications for the virtual machine. More particularly, for example, the destination host and the origin host may be connected to different switches and/or different switch ports. When the virtual machine is migrated to the destination host, the switch ports to which the destination host is connected may need to be reconfigured to be associated with the virtual machine. This may result in a network topology change.

Network topology is an arrangement of elements (e.g., links, nodes, etc.) of a communication network. A virtual machine migration relies on network notifications (e.g., notifications including a MAC address of the virtual machine) to announce the new location of the virtual machine. For example, the origin hypervisor and/or the destination hypervisor may broadcast migration notifications on behalf of the virtual machine undergoing migration. In some implementations, the destination hypervisor may broadcast a reverse address resolution protocol (RARP) packet with an invalid network address (e.g., an invalid IP address). During the broadcast, the RARP packet may be transmitted to all host systems on the network, then forwarded by the respective hypervisors to the virtual machines (including nested virtual machines). Considerable central processing unit (CPU) activity is expended by the host systems to wake up every virtual machine running, including those that disable or are incapable of bridging and have no need for topology change notifications. This results in latency spikes, wasted power, and interruptions to other tasks being processed.

Aspects of the present disclosure address the above-noted and other deficiencies by providing technology that enhances topology change notifications of virtualized computer systems. In particular, aspects of the present disclosure provide technology that allows a hypervisor to install packet filters that prevent notification packets from reaching virtual machines. In an example, a hypervisor may receive a request that no topology change notifications be delivered to a virtual machine managed by the hypervisor. The request may include a notification that bridging is disabled by the virtual machine. The hypervisor may then install a packet filter, such as a Berkley Packet Filter, on a vNIC associated with the virtual machine. The packet filter may be specific to topology change notification packets. When the packet filter receives a topology change notification packet (e.g., a RARP packet including an invalid network address), the packet filter may drop the topology change notification packet, thus preventing the notification packet from reaching the virtual machine. Other data packets may pass through (be accepted by) the packet filter. As such, the virtual machine is not interrupted by the topology change notification packet, thus preventing latency spikes, power waste, and task interruptions.

Various aspects of the above referenced methods and systems are described in details herein below by way of examples, rather than by way of limitation. The examples provided below discuss a virtualized computer system where memory movement may be initiated by aspects of a hypervisor, a host operating system, a virtual machine, or a combination thereof. In other examples, the memory movement may be performed in a non-virtualized computer system that is absent a hypervisor or other virtualization features discussed below.

FIG. 1 depicts an illustrative architecture of elements of a computer system 100, in accordance with an embodiment of the present disclosure. It should be noted that other architectures for computer system 100 are possible, and that the implementation of a computing device utilizing embodiments of the disclosure are not necessarily limited to the specific architecture depicted. Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. In another example, computer system 100 may be a computing device implemented with PowerPC®, SPARC®, or other hardware. In the example shown in FIG. 1, computer system 100 may include virtual machines 110A-C, hypervisor 120, hardware devices 130, and a network 140.

Virtual machines 110A-C may execute guest executable code that uses an underlying emulation of the physical resources. The guest executable code may include a guest operating system, guest applications, guest device drivers, etc. Virtual machines 110A-C may support hardware emulation, full virtualization, para-virtualization, operating system-level virtualization, or a combination thereof. Virtual machines 110A-C may have the same or different types of guest operating systems, such as Microsoft®, Windows®, Linux®, Solaris®, etc. Virtual machines 110 A-C may execute guest operating systems 112A-C that manage guest memory 114 A-C and virtual network interface controllers (vNICs) 116A-C, respectively.

VNICs 116A-C may be virtual adapters configured to provide virtual machines 110A-C with a virtual interface which can communicate with other networked devices using specific physical layer and data link layer standards. VNIC 116A-C may be connected to virtual ports of a virtual switch. A virtual switch is a logically defined layer 2 device that passes frames between nodes. Virtual machines 110A-C may communicate with each other using the virtual switch. The virtual switch may be connected to one or multiple physical network controller interface (NICs) 136, which may be used to create a bridge connection (via a network bridge) to a separate computer network. The network bridge is a device that creates a connection between two separate computer networks and uses media access control (MAC) address information to make decisions regarding forwarding packets. A network bridge may interconnect two local area networks (LANs) together and/or separate network segments. A network segment may be a section of a network that is separated by bridges, switches, and/or routers.

Guest memory 114A-C may be any virtual memory, logical memory, physical memory, other portion of memory, or a combination thereof for storing, organizing, or accessing data. Guest memory 114A-C may represent the portion of memory that is designated by hypervisor 120 for use by virtual machine 110A-C. Guest memory 114A-C may be managed by guest operating system 112A-C, respectively, and may be segmented into guest pages. The guest pages may each include a contiguous or non-contiguous sequence of bytes or bits and may have a page size that is the same or different from a memory page size used by hypervisor 120. Each of the guest page sizes may be a fixed-size, such as a particular integer value (e.g., 4 KB, 2 MB) or may be a variable-size that varies within a range of integer values. In one example, the guest pages may be memory blocks of a volatile or non-volatile memory device and may each correspond to an individual memory block, multiple memory blocks, or a portion of a memory block.

Hypervisor memory 124 (e.g., host memory) may be the same or similar to the guest memory but may be managed by hypervisor 120 instead of a guest operating system. Hypervisor memory 124 may include host pages, which may be in different states. The states may correspond to unallocated memory, memory allocated to guests, and memory allocated to hypervisor. The unallocated memory may be host memory pages that have not yet been allocated by hypervisor memory 124 or were previously allocated by hypervisor 120 and have since been deallocated (e.g., freed) by hypervisor 120. The memory allocated to guests may be a portion of hypervisor memory 124 that has been allocated by hypervisor 120 to virtual machine 110A-C and corresponds to guest memory 114A-C, respectively. Other portions of hypervisor memory may be allocated for use by hypervisor 120, a host operating system, hardware device, other module, or a combination thereof.

Hypervisor 120 (also known as a virtual machine monitor (VMM)) may provide virtual machines 110A-C with access to one or more features of the underlying hardware devices 130. In the example shown, hypervisor 120 may run directly on the hardware of computer system 100 (e.g., bare metal hypervisor). In other examples, hypervisor 120 may run on or within a host operating system (not shown). Hypervisor 120 may manage system resources, including access to hardware devices 130. In the example shown, hypervisor 120 may include a topology component 122.

Topology component 122 may include may receive notifications from virtual machine 110A-C requesting that topology change notifications be delivered or not delivered to the virtual machine 110A-C. The notification may include whether bridging is enabled or disabled by the virtual machine 110A-C. Bridging refers to using a network bridge for communication between networks or network segments. When the notification indicates that virtual machine 110A-C has disabled bridging, this may indicate that virtual machine 110A-C requests that no topology change notifications be delivered to virtual machine 110A-C. Topography component 122 may install a packet filter on vNIC 116A-C, where the packet filter matches topology change notification packets. The packet filter may drop incoming topology change notification packets.

Hardware devices 130 may provide hardware resources and functionality for performing computing tasks. Hardware devices 130 may include one or more physical storage devices 132, one or more physical processing devices 134, one or more physical network interface controllers 136, other computing devices, or a combination thereof. One or more of hardware devices 130 may be split up into multiple separate devices or consolidated into one or more hardware devices. Some of the hardware device shown may be absent from hardware devices 130 and may instead be partially or completely emulated by executable code.

Physical storage devices 132 may include any data storage device that is capable of storing digital data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. In one example, physical storage devices 132 may be physical memory and may include volatile memory devices (e.g., random access memory (RAM)), non-volatile memory devices (e.g., flash memory, NVRAM), and/or other types of memory devices. In another example, physical storage devices 132 may include one or more mass storage devices, such as hard drives, solid state drives (SSD)), other data storage devices, or a combination thereof. In a further example, physical storage devices 132 may include a combination of one or more memory devices, one or more mass storage devices, other data storage devices, or a combination thereof, which may or may not be arranged in a cache hierarchy with multiple levels.

Physical processing devices 134 may include one or more processors that are capable of executing the computing tasks. Physical processing devices 134 may be a single core processor that is capable of executing one instruction at a time (e.g., single pipeline of instructions) or may be a multi-core processor that simultaneously executes multiple instructions. The instructions may encode arithmetic, logical, or I/O operations. In one example, physical processing devices 134 may be implemented as a single integrated circuit, two or more integrated circuits, or may be a component of a multi-chip module (e.g., in which individual microprocessor dies are included in a single integrated circuit package and hence share a single socket). A physical processing device may also be referred to as a central processing unit ("CPU").

Physical network interface controllers (NICs) 136 may include a computer hardware component that connects a computer system 100 to a computer network. NICs 136 may include electronic circuitry required to communicate with other networked devices using specific physical layer and data link layer standards.

Network 140 may be a public network (e.g., the internet), a private network (e.g., a local area network (LAN), a wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
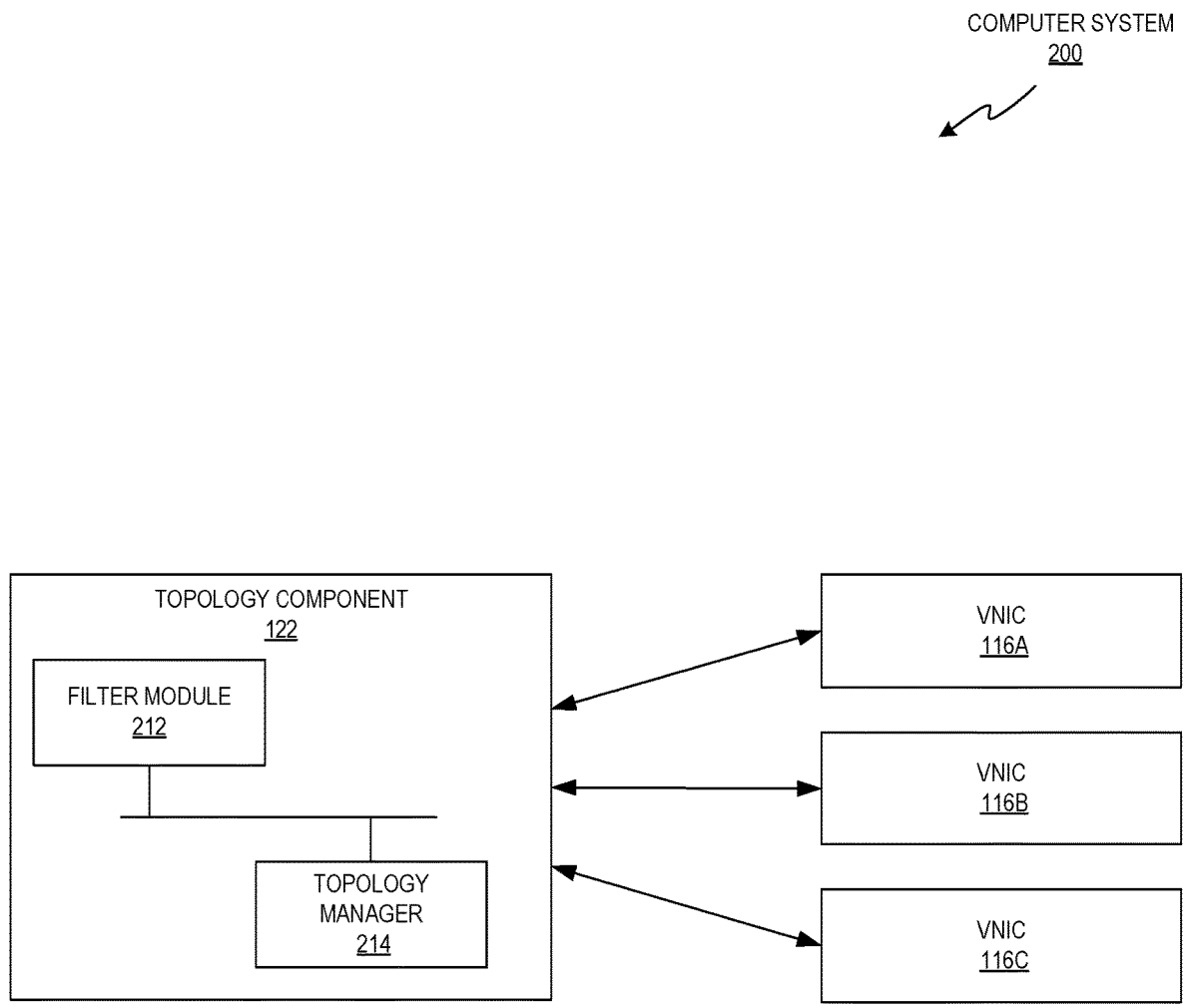
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. Computer system 200 may comprise executable code that implements one or more of the components and modules and may be implemented within a hypervisor, a host operating system, a guest operating system, hardware firmware, or a combination thereof. In the example shown, computer system 200 may include topology component 122 and vNICs 116A-C.

Topology component 122 may enable computer system 200 to manage topology notification change notifications and install packet filters to enhance the performance of computer system 200. As illustrated, topology component 122 may include a filter module 212 and a topology manager 214.

Filter module 212 may install and uninstall packet filters on vNICs 116A-C. In an example, filter module 212 may receive, from virtual machine 110A, a request that no topology change notifications be delivered to virtual machine 110A (e.g., if the virtual machine does not perform network bridging, it does not need to receive topology change notification). The request may include a notification of bridging being disabled by virtual machine 110A, an instruction that no topology change notifications be delivered to virtual machine 110A, or any other notification or instruction that can be interpreted as virtual machine 110A requesting no topology change notifications be delivered. Filter module 212 may then install a packet filter on vNIC 116A, which is associated with virtual machine 110A. The packet filter may include a Berkley Packet Filter, a Linux Socket Filter, or any other packet filter capable of filtering data packets. The packet filter may pass through packets not related to topology change notifications.

In another example, filter module 212 may receive a request that topology change notifications be delivered to virtual machine 110A. The request may include a notification of bridging being enabled by virtual machine 110A, an instruction that topology change notifications be delivered to virtual machine 110A, or any other notification or instruction that can be interpreted as virtual machine 110A requesting topology change notifications be delivered. If vNIC 116A has a filter packet installed, the filter module 212 may uninstall (or disable) the packet filter from vNIC 116A.

Topology manager 212 may receive topology change notifications and forward the topology change notifications to virtual machines 110A-C. When vNIC 116A has a packet filter installed, responsive to the packet filter receiving the topology notification change packet, the packet filter may drop the topology change notification packet. The topology change notification packet may be a RARP packet including an invalid network address.

Figure 3:
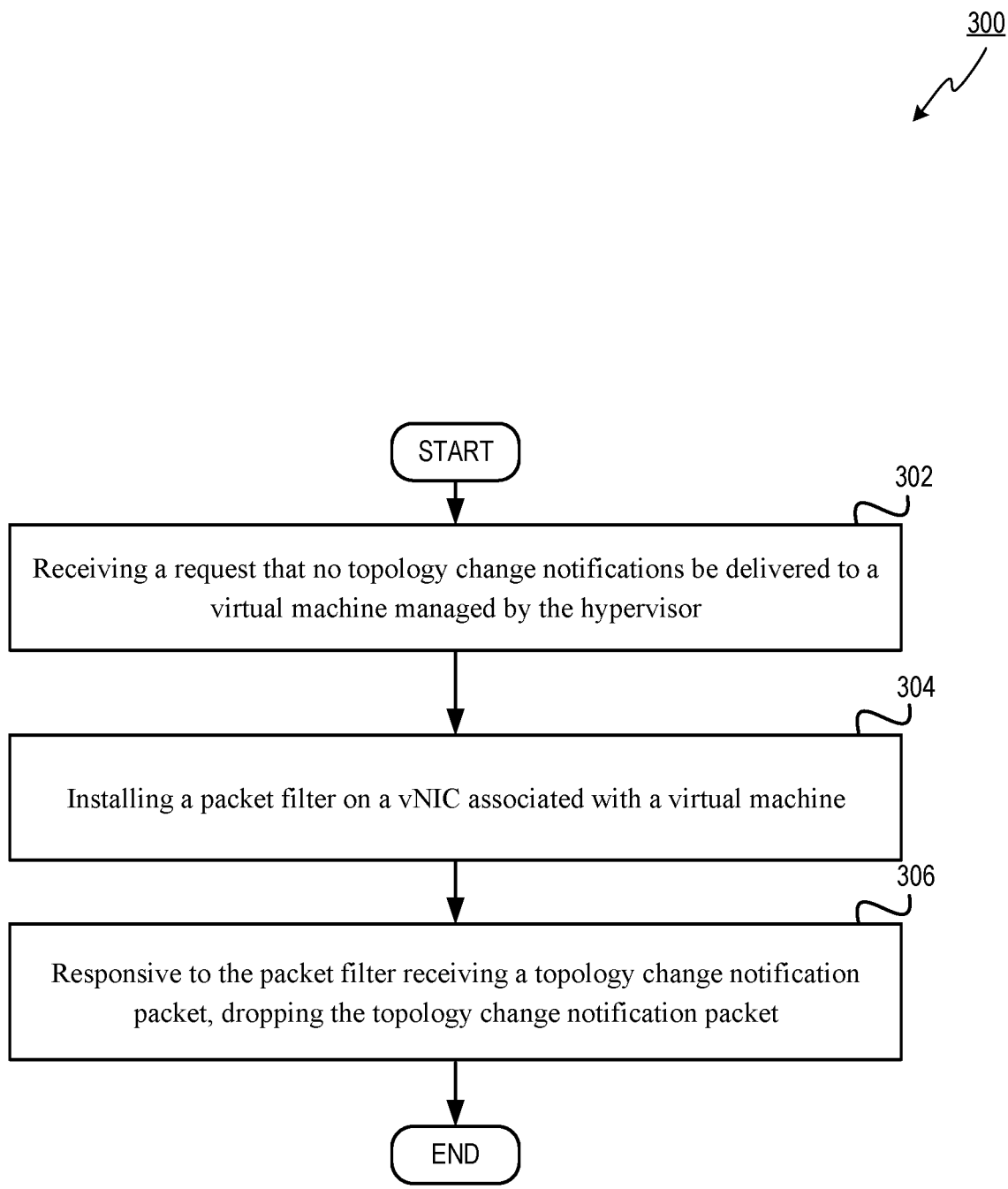
FIG. 3 depicts a flow diagram of an example method for topology change notification management, in accordance with one or more aspects of the present disclosure.

FIG. 3 depicts a flow diagram of an illustrative example of a method 300 for topology change notification management, in accordance with one or more aspects of the present disclosure. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processes implementing method 300 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a kernel of a hypervisor as shown in FIG. 1 or by an executable code of a host machine (e.g., host operating system or firmware), a virtual machine (e.g., guest operating system or virtual firmware), other executable code, or a combination thereof.

Method 300 may be performed by processing devices of a server device or a client device and may begin at block 302. At block 302, a host computer system running a hypervisor may receive, from a virtual machine managed by the hypervisor, a request that no topology change notifications be delivered to the virtual machine. The request may include a notification of bridging being disabled by the virtual machine.

At block 304, the host computer system may install a packet filter on a vNIC associated with a virtual machine. The packet filter may include a Berkley Packet Filter, a Linux Socket Filter, or any other packet filter capable of filtering data packets. The packet filter may pass through packets not related to topology change notifications.

At block 306, the host computer system may, responsive to the packet filter receiving a topology change notification packet, drop the topology change notification packet. The topology change notification packet may include a RARP packet including an invalid network address. In an example, the host computer system may receive a subsequent request that topology change notifications be delivered to the virtual machine. The subsequent request may include a notification of bridging being enabled by the virtual machine. In response to the further request, the host system may disable the packet filter at the vNIC. Responsive to completing the operations described herein above with references to block 306, the method may terminate.

Figure 4:
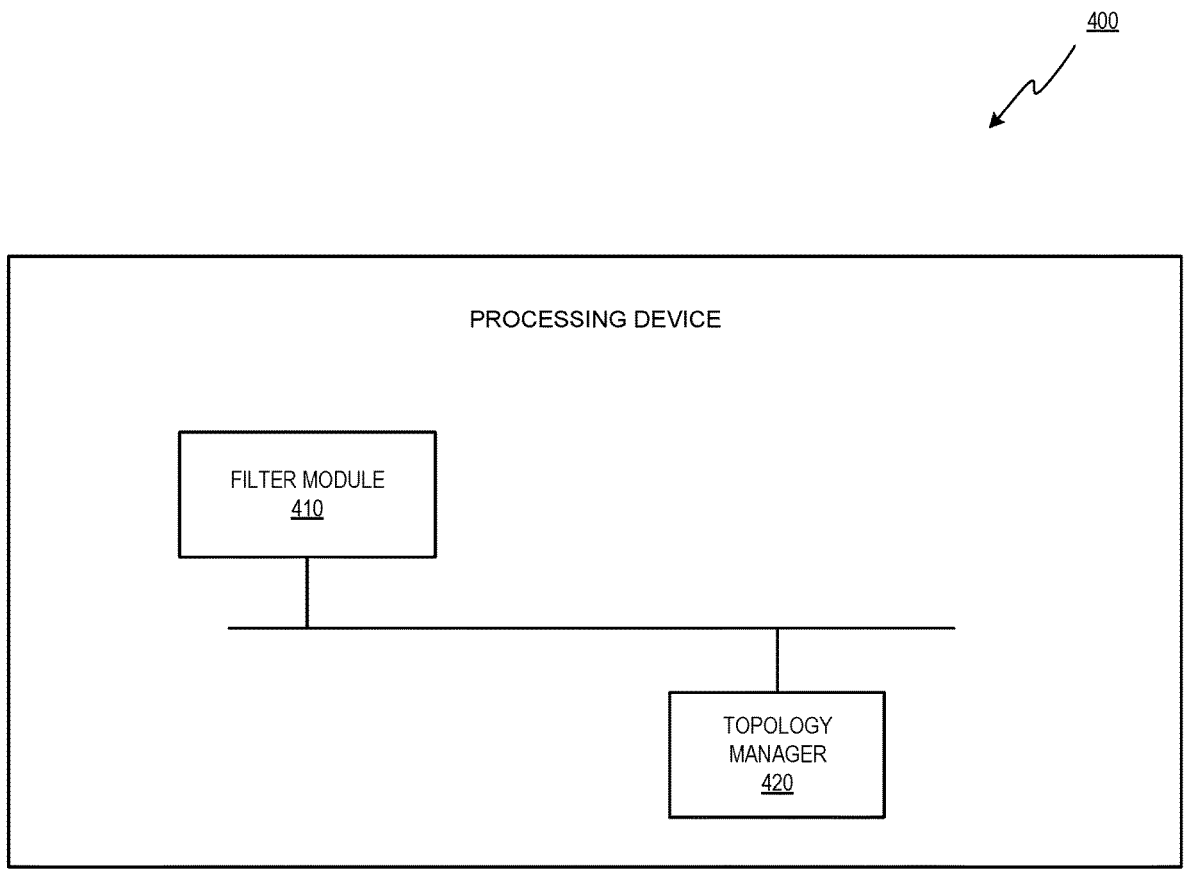
FIG. 4 depicts a block diagram of an example computer system in accordance with one or more aspects of the present disclosure.

FIG. 4 depicts a block diagram of a computer system 400 operating in accordance with one or more aspects of the present disclosure. Computer system 400 may be the same or similar to computer system 200 and computer system 100 and may include one or more processing devices and one or more memory devices. In the example shown, computer system 400 may include a filter module 410 and a topology manager 420.

Filter module 410 may install a packet filter on a vNIC associated with a virtual machine. In an example, filter module 410 may receive a request from that no topology change notifications be delivered to a virtual machine. The request may include a notification of bridging being disabled by the virtual machine. The filter module 410 may install a packet filter on a vNIC associated with the virtual machine. The packet filter may include a Berkley Packet Filter, a Linux Socket Filter, or any other packet filter capable of filtering data packets. The packet filter may pass through packets not related to topology change notifications.

Topology manager 420 may receive topology change notification packets and forward the topology change notification packets to the virtual machine. Responsive to the packet filter receiving the topology notification packet, the packet filter may drop the topology change notification packet. The topology change notification packet may be a RARP packet including an invalid network address.

Filter module 410 may also uninstall or disable the packet filter from the vNIC. In an example, the filter module 410 may receive a request from that topology change notifications be delivered to virtual machine. The request may include a notification of bridging being enabled by virtual machine. In response to the notification, the filter module 410 may uninstall or disable the packet filter from the vNIC.

Figure 5:
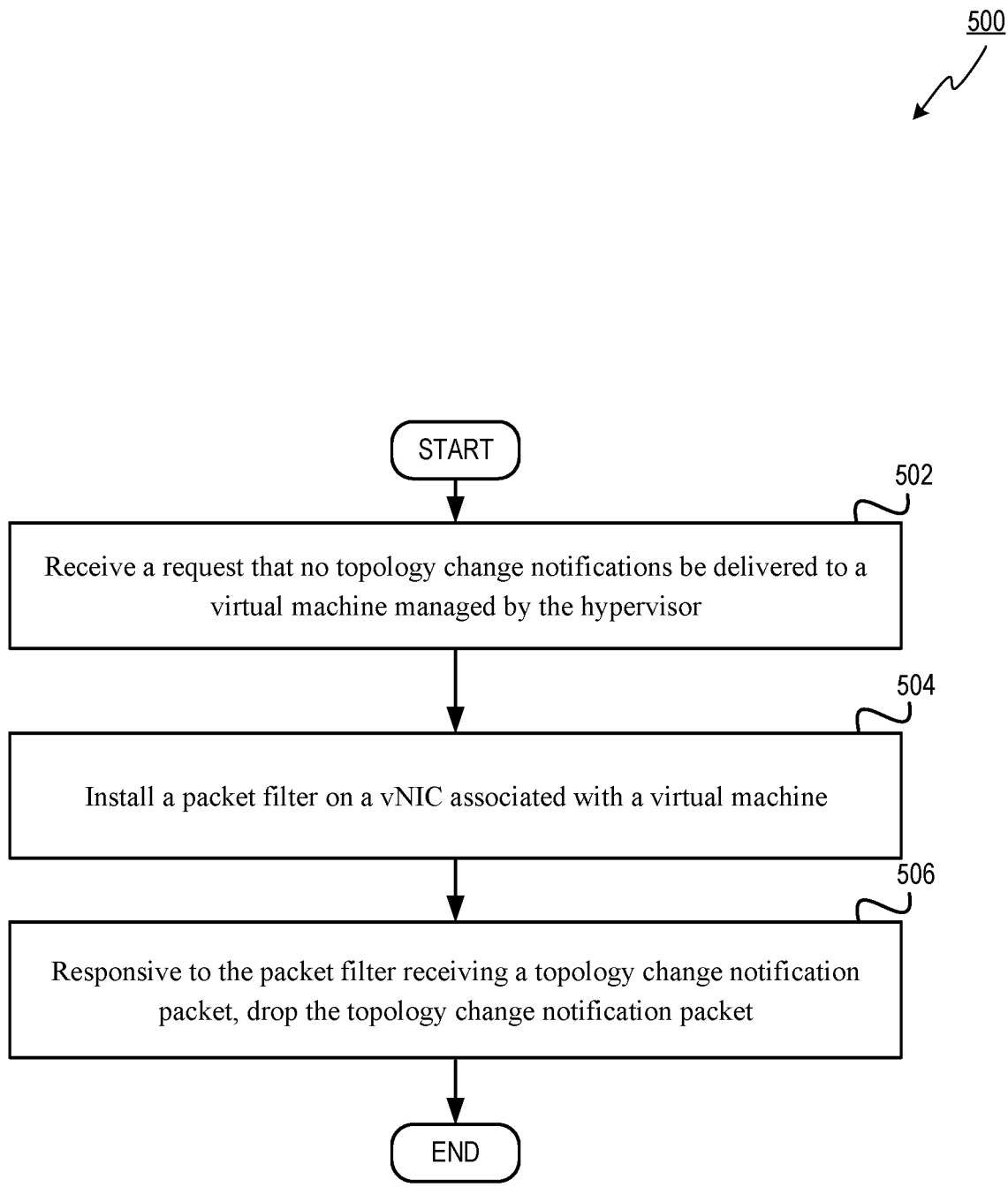
FIG. 5 depicts a flow diagram of an example method topology change notification management, in accordance with one or more aspects of the present disclosure.

FIG. 5 depicts a flow diagram of one illustrative example of a method 500 for virtualized memory management, in accordance with one or more aspects of the present disclosure. Method 500 may be similar to method 300 and may be performed in the same or a similar manner as described above in regards to method 300. Method 500 may be performed by processing devices of a server device or a client device and may begin at block 502.

At block 502, the processing device may run a hypervisor and receive a request that no topology change notifications be delivered to a virtual machine managed by the hypervisor. The request may include a notification of bridging being disabled by the virtual machine.

At block 504, the processing device may install a packet filter on a vNIC associated with a virtual machine. The packet filter may include a Berkley Packet Filter, a Linux Socket Filter, or any other packet filter capable of filtering data packets. The packet filter may pass through packets not related to topology change notifications.

At block 506, the processing device may, responsive to the packet filter receiving a topology change notification packet, drop the topology change notification packet. The topology change notification packet may include a RARP packet including an invalid network address. In an example, the processing device may, may receive a subsequent request that topology change notifications be delivered to the virtual machine. The subsequent request may include a notification of bridging being enabled by the virtual machine. In response to the further request, the processing device may disable the packet filter from the vNIC. Responsive to completing the operations described herein above with references to block 512, the method may terminate.

Figure 6:
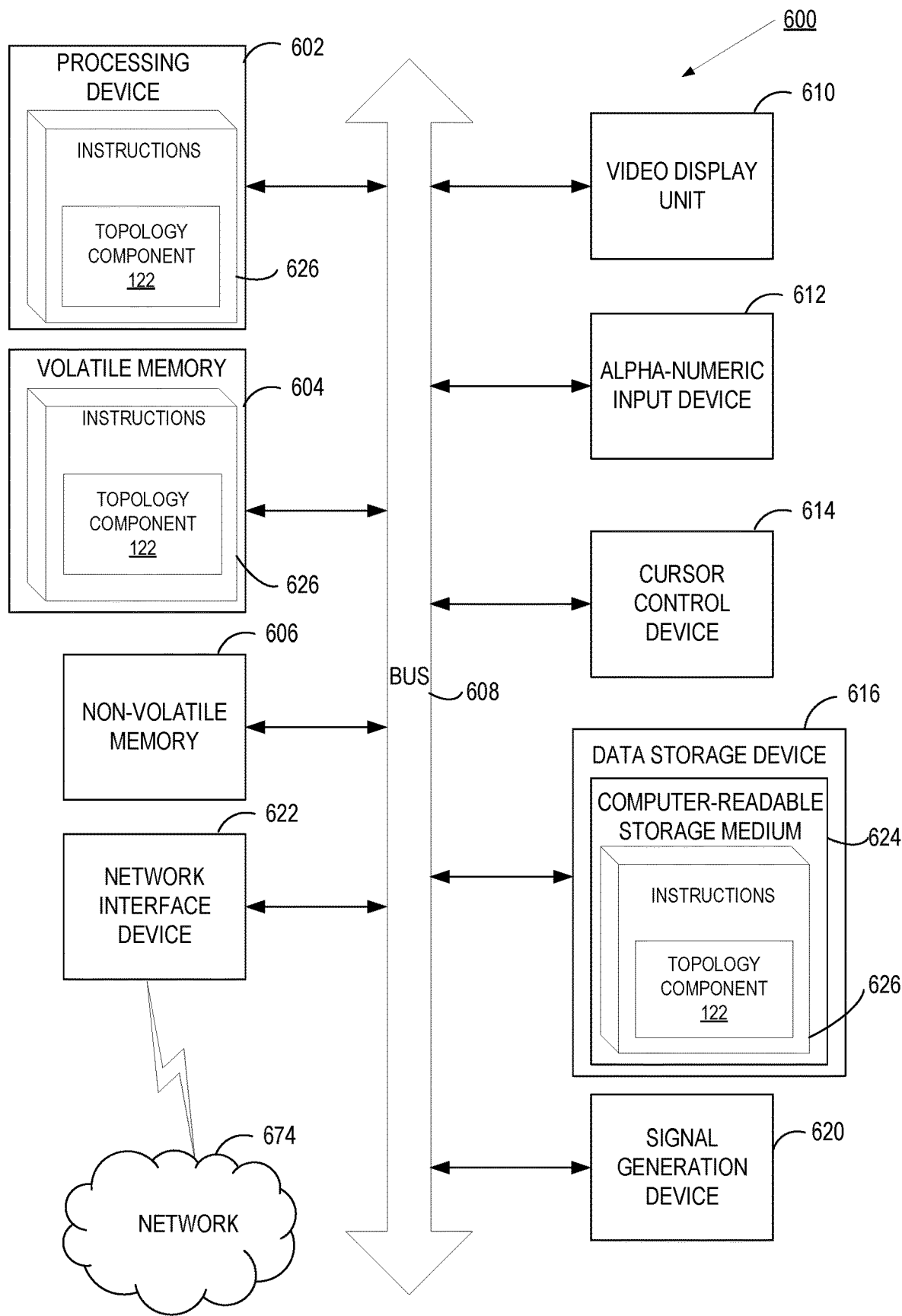
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing device 100 of FIG. 1 or computer system 200 of FIG. 2. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 and 500 and for topography component 122, and modules illustrated in FIGS. 1 and 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300 or 500 and one or more of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a hypervisor running on a host computer system and from a virtual machine managed by the hypervisor, a request that no topology change notifications be delivered to the virtual machine, wherein the request comprises a notification of bridging being disabled by the virtual machine;

installing a packet filter on a virtual network interface controller (vNIC) associated with the virtual machine; and responsive to receiving, by the packet filter, a topology change notification packet indicating a change in a network bridge, dropping the topology change notification packet.

2. The method of claim 1, wherein the packet filter comprises a Berkeley Packet Filter.

3. The method of claim 1, wherein the topology change notification packet comprises a Reverse Address Resolution Protocol (RARP) packet including an invalid network address.

4. The method of claim 1, further comprising:

receiving, a subsequent request that topology change notifications be delivered to the virtual machine; and disabling the packet filter at the vNIC associated with the virtual machine.

5. The method of claim 4, wherein the further request comprises a notification of bridging being enabled by the virtual machine.

6. The method of claim 1, wherein the packet filter passes through packets not related to topology change notifications.

7. A system, comprising:

a memory;

a processing device operatively coupled to the memory, the processing device configured to:

receive, from a virtual machine managed by a hypervisor, a request that no topology change notifications be delivered to the virtual machine, wherein the request comprises a notification of bridging being disabled by the virtual machine;

install a packet filter on a virtual network interface controller (vNIC) associated with the virtual machine; and responsive to receiving, by the packet filter, a topology change notification packet indicating a change in a network bridge, drop the topology change notification packet.

8. The system of claim 7, wherein the packet filter comprises a Berkeley Packet Filter.

9. The system of claim 7, wherein the topology change notification packet comprises a Reverse Address Resolution Protocol (RARP) packet including an invalid network address.

10. The system of claim 7, further comprising the processing device being configured to:

receiving, a subsequent request that topology change notifications be delivered to the virtual machine; and disabling the packet filter at the vNIC associated with the virtual machine.

11. The system of claim 10, wherein the further request comprises a notification of bridging being enabled by the virtual machine.

12. The system of claim 7, wherein the packet filter passes through packets not related to topology change notifications.

13. A non-transitory machine-readable storage medium storing instructions that cause a processing device to:

receive, from a virtual machine managed by a hypervisor, a request that no topology change notifications be delivered to the virtual machine, wherein the request comprises a notification of bridging being disabled by the virtual machine;

install a packet filter on a virtual network interface controller (vNIC) associated with the virtual machine; and responsive to receiving, by the packet filter, a topology change notification packet indicating a change in a network bridge, drop the topology change notification packet.

14. The non-transitory machine-readable storage medium of claim 13, wherein the packet filter comprises a Berkeley Packet Filter.

15. The non-transitory machine-readable storage medium of claim 13, wherein the topology change notification packet comprises a Reverse Address Resolution Protocol (RARP) packet including an invalid network address.

16. The non-transitory machine-readable storage medium of claim 13, further comprising the processing device being configured to:

receiving, a subsequent request that topology change notifications be delivered to the virtual machine; and disabling the packet filter at the vNIC associated with the virtual machine.

17. The non-transitory machine-readable storage medium of claim 16, wherein the further request comprises a notification of bridging being enabled by the virtual machine.

* * * * *